US010150081B2

(12) United States Patent
Nurkowski et al.

(10) Patent No.: US 10,150,081 B2
(45) Date of Patent: Dec. 11, 2018

(54) WELLHEAD EMISSION CONTROL SYSTEM

(71) Applicant: Metan Group LLC, Shorewood, IL (US)

(72) Inventors: Julian Nurkowski, Shorewood, IL (US); John Nurkowski, Kelowna (CA); Kelvin Nurkowski, Slave Lake (CA); Derek Nurkowski, Shorewood, IL (US)

(*) Notice: Subject to any disclaimer, the term of this patent is extended or adjusted under 35 U.S.C. 154(b) by 133 days.

(21) Appl. No.: 15/341,841

(22) Filed: Nov. 2, 2016

(65) Prior Publication Data
US 2017/0120191 A1 May 4, 2017

Related U.S. Application Data

(60) Provisional application No. 62/249,643, filed on Nov. 2, 2015.

(51) Int. Cl.
*B01D 53/86* (2006.01)
*B01D 53/88* (2006.01)
(Continued)

(52) U.S. Cl.
CPC ......... *B01D 53/885* (2013.01); *B01D 53/864* (2013.01); *E21B 33/03* (2013.01);
(Continued)

(58) Field of Classification Search
None
See application file for complete search history.

(56) References Cited

U.S. PATENT DOCUMENTS 5,131,224 A   7/1992  Siewert et al.
6,999,883 B1  2/2006  Brady et al.
(Continued)

FOREIGN PATENT DOCUMENTS

CA   2325966 A1 *  5/2002  ......... B01D 53/8668
CA   2325966 A1    5/2002

OTHER PUBLICATIONS

Hayes, R. Catalytic Solutions for Fugitive Methane Emissions in the Oil and Gas Sector. Chemical Engineering Science, 59. pp. 4073-4080. https://www.sciencedirect.com/science/article/pii/S0009250904003641 (Year: 2004).*

*Primary Examiner* — Walter D. Griffin
*Assistant Examiner* — Jelitza M Perez
(74) *Attorney, Agent, or Firm* — Global Intellectual Property Agency, LLC; Daniel Boudwin

(57) ABSTRACT

A system for reducing methane emissions from a natural gas or oil wellhead. Some oil and gas wells leak a flow of natural gas, referred to as the surface casing vent flow. The system includes a catalytic oxidizing assembly operably connectable to the wellhead and configured to receive the surface casing vent flow therefrom. The catalytic oxidizing assembly includes a catalyst pad heated to a temperature sufficient to reduce the methane in the surface casing vent flow to carbon dioxide in the presence of oxygen. When the temperature and flow rate of the methane is sufficient, the heat generated by the exothermic oxidative reaction of the methane is sufficient to maintain the surface temperature of the catalyst pad, allowing the system to deactivate the heating element. The system can further include a separator configured to isolate a gas component of a surface casing vent flow when liquid is present.

32 Claims, 2 Drawing Sheets

(51) Int. Cl.
*E21B 33/03* (2006.01)
*E21B 41/00* (2006.01)

(52) U.S. Cl.
CPC .. *E21B 41/0057* (2013.01); *B01D 2255/1021* (2013.01); *B01D 2255/1023* (2013.01); *B01D 2257/7025* (2013.01); *Y02C 20/20* (2013.01)

(56) References Cited

U.S. PATENT DOCUMENTS

| | | |
|---|---|---|
| 7,448,828 B2 | 11/2008 | Augenstein et al. |
| 7,520,743 B1 | 4/2009 | Roberts |
| 2004/0192546 A1 | 9/2004 | Dang et al. |
| 2009/0282976 A1 | 11/2009 | Ruskin |

* cited by examiner

WELLHEAD EMISSION CONTROL SYSTEM

CROSS REFERENCE TO RELATED APPLICATIONS

This application claims the benefit of U.S. Provisional Application No. 62/249,643 filed on Nov. 2, 2015. The above identified patent application is herein incorporated by reference in its entirety to provide continuity of disclosure.

BACKGROUND OF THE INVENTION

The present invention relates to systems configured to reduce the impact of greenhouse gas emissions from natural gas or oil wells.

Oil and gas wells consist of a number of concentric casings, which extended into the ground to different depths. The casings include the production casing, which produces oil or natural gas for sale, and a surface casing vent near the top of the well. Whether due to material failure, high pressures, the integrity of the well casings, inadequate engineering, or any other number of reasons, a significant number of wells, once drilled and put into production or capped, leak a flow of natural gas from the annular space between the surface casing and the next casing wall. This interstitial flow of natural gas is known as the surface casing vent flow and must be vented, typically to the atmosphere. The surface casing vent flow is typically composed primarily of methane, but also includes ethane, propane, butane, and various other inert gasses. When the surface casing vent flow is vented to the atmosphere, a significant amount of methane, a greenhouse gas, is thus being emitted to the atmosphere.

The reduction of emissions of greenhouse gasses is part of an expanding and increasingly aggressive effort to combat climate change. To this effect, the Environmental Protection Agency (EPA) has set a goal of reducing methane emissions by 40-45% from 2012 levels by 2025 and other jurisdictions, such as Canada, are following the EPA's lead. This goal in reducing methane emissions by 2025 would potentially have a large effect on natural gas and oil drilling firms as methane is the predominant component of natural gas. One possible method of combating methane emissions is to react methane with oxygen to form carbon dioxide (and water). Although methane persists in the atmosphere for less time, methane is more than twenty-five times more powerful of a greenhouse gas than carbon dioxide in trapping heat on a common 100-year basis. Therefore, although this reaction forms carbon dioxide, which is also a greenhouse gas, it has a significant net benefit on climate change by reducing the overall effects of greenhouse gasses. If natural gas or oil flows received at a wellhead could be treated to convert endogenous methane to carbon dioxide prior to any emissions from the system reaching the atmospheric environment, then it could effectively and efficiently assist the natural gas and oil industry in complying with the EPA's methane emission goals.

SUMMARY OF THE INVENTION

In view of the foregoing disadvantages inherent in the known types of methane treatment systems now present in the prior art, the present invention provides a system configured to convert the methane of a surface casing vent flow to carbon dioxide. The methane emission control system for a wellhead includes a catalytic oxidizing assembly operably connectable to the wellhead. The catalytic oxidizing assembly is configured to receive the surface casing vent flow from the surface casing vent of the wellhead. The catalytic oxidizing assembly including a catalyst pad, which is constructed of a material suitable for oxidizing methane, and a heating element. The heating element configured to heat the catalyst pad to a threshold temperature in order to initiate oxidation of the methane of the surface casing vent flow. In one embodiment, the system further includes a pressure control valve configured to bypass the surface casing vent flow from the catalytic oxidizing assembly if a flow rate of the surface casing vent flow falls below a floor level, the floor level of the flow rate corresponding to the flow rate wherein exothermic oxidation of methane in the gas component maintains the threshold temperature. The system can further include a pressure release valve configured to bypass all or part of the gas component from the catalytic oxidizing assembly if the flow rate of the surface casing vent flow through the system exceeds a ceiling level. In an embodiment of the system configured for use with surface casing vent flows containing a liquid component, the system further comprises a separator operably connectable to the wellhead casing vent that is configured to isolate the gas component from the liquid component of the surface casing vent flow.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
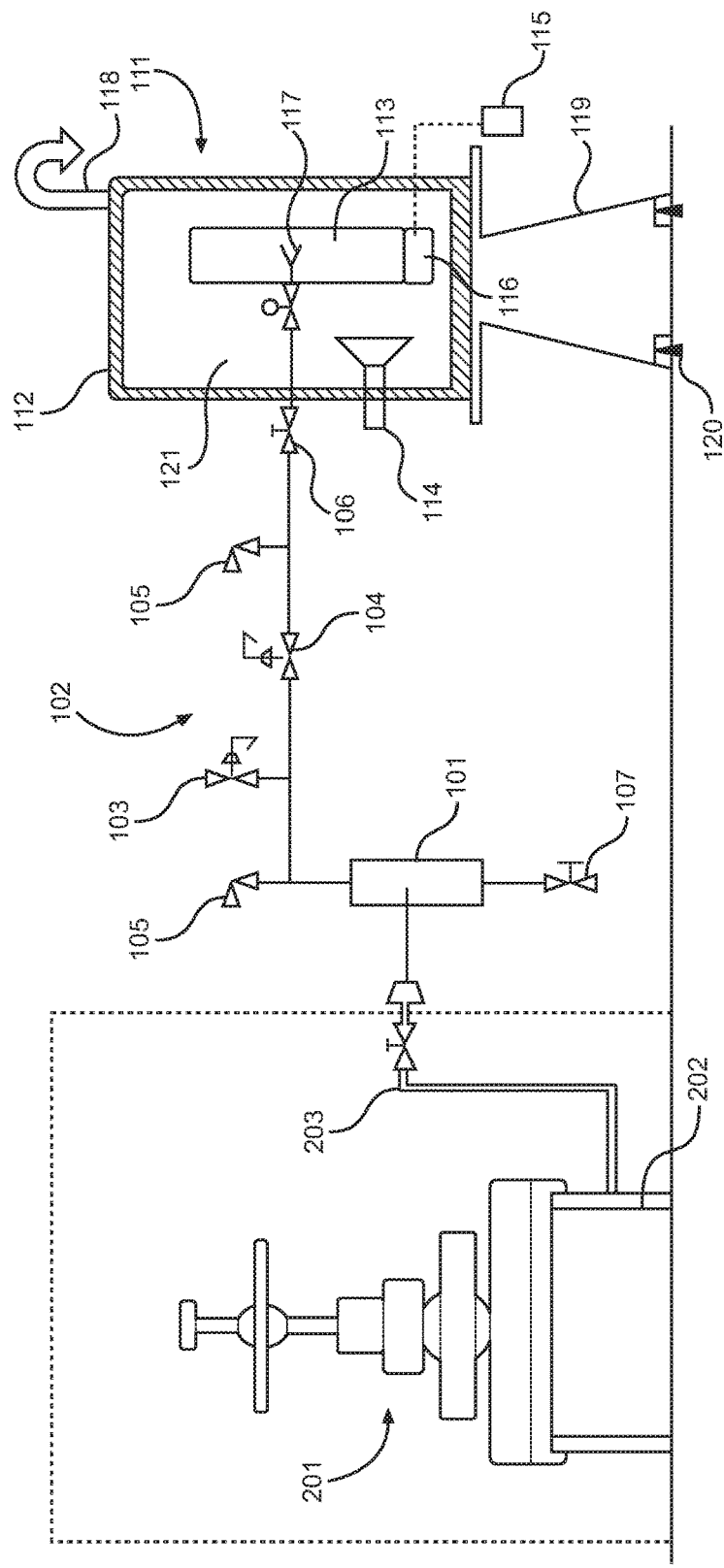
FIG. 1 shows a diagram of a wellhead methane emission control system.

Reference is made herein to the attached drawings. Like reference numerals are used throughout the drawings to depict like or similar elements of the wellhead methane emission control system. The figures are intended for representative purposes only and should not be considered to be limiting in any respect.

Referring now to FIG. 1, there is shown a diagram of a wellhead methane emission control system. The present system is configured to control methane emissions from a wellhead 201 of a natural gas or oil well by receiving the surface casing vent flow from the wellhead 201 and then reacting methane from the surface casing vent flow in the presence of oxygen to produce carbon dioxide. Other components of the natural gas, including ethane and propane, may additionally be oxidized through operation of the present system. The system is operably connectable to, i.e., configured to be in fluid communication with, a surface casing vent 203 of a wellhead 201 via, e.g., a pipe attachment. The surface casing vent 203 extends from the casing 202 of the wellhead 201 and serves as a vent for the surface casing vent flow, i.e., the natural gas leaking or flowing through the interstitial space between the surface casing and the adjacent inner casing.

The wellhead emission control system includes a catalytic oxidizing assembly 111 that is operably connectable to a wellhead surface casing vent 203. The connection to the wellhead surface casing vent 203 allows the catalytic oxidizing assembly 111 to receive the surface casing vent flow vented therefrom. In one embodiment, the catalytic oxidizing assembly 111 is connected to the wellhead surface casing vent 203 via a pressure control assembly 102 configured to regulate the pressure of the wellhead stream passing therethrough. The catalytic oxidizing assembly 111 includes a catalyst pad 113 operably coupled to a heating element 116. The catalyst pad 113 includes platinum, palladium, or any other such metallic catalyst configured to oxidize methane. In an illustrative embodiment, the heating element 116 includes an electrical heating element operably coupled to a power source 115. In one embodiment, the heating element 116 is configured to raise the surface temperature of the catalyst pad 113 to at least 150° C. This temperature is sufficient to ensure oxidation of the methane. In a further embodiment, the heating element 116 is configured to heat the catalyst pad 113 to between 150-200° C. The reactive capacity of the system is proportional to the surface area of the catalyst pad 113. In one embodiment, the capacity of the catalyst pad 113 is 6,000 Btu/ft$^2$ (19 Kw-h/m$^2$).

The catalyst pad 113 and the heating element 116 are disposed within a housing 112, which forms an enclosed interior volume. In one embodiment, the housing 112 is a watertight compartment, which is beneficial because the catalytic oxidizing assembly 111 would be utilized in outdoor environments where water, snow, organic debris, and inorganic debris could potentially interfere with the oxidation reaction of the gas with the catalyst pad 113 if it infiltrated the housing 112.

When the gas from the wellhead stream enters the catalytic oxidizing assembly 111, it is directed against the catalyst pad 113 via, e.g., tubing and nozzles 117, in order to ensure that the oxidation reaction occurs in a consistent manner. In order for the oxidation of the methane in the gas to occur, the catalyst pad 113 must be heated to a threshold temperature. The heating element 116 is utilized to initially heat the catalyst pad 113 to the threshold temperature, i.e., 150° C. The oxidation reaction of the methane is an exothermic reaction; therefore, once the oxidation reaction of the methane reaches a steady state, the heating element 116 can be deactivated and the threshold temperature of the catalyst pad 113 is sustained by the heat generated by the oxidation of the methane. Under standard operating conditions, the oxidative efficiency of the reaction is greater than 98% with no significant amount of hazardous air pollutants, such as carbon monoxide or mono-nitrogen oxides, formed.

The housing 112 further includes an air intake 114, which is configured to communicate atmospheric air into the catalytic oxidizing assembly 111 for driving the oxidation reaction. Once the intake gas is driven over the catalyst pad 113 and the oxidation reaction has occurred, the resulting processed gas is then emitted from the catalytic oxidizing assembly 111 via an outlet 118. In one embodiment, the outlet 118 emits the processed, methane-free gas to the atmosphere. In another embodiment, the outlets 118 transmits the processed, methane-free gas to a secondary system for additional processing or utilization for any number of purposes.

In order for the proper temperature to be maintained at the catalyst pad 113 via the exothermic oxidation reaction of the methane, the gas from the wellhead stream must be directed into the catalytic oxidizing assembly 111 at a self-sustaining flow rate. In a first embodiment of the present system, if the flow rate of the gas falls below the self-sustaining or floor level at the pressure regulating valve 104, the gas from the wellhead stream automatically bypasses the catalytic oxidizing assembly 111 and is, e.g., released to the atmosphere in a raw, unprocessed state at pressure control valve 103. Conversely, if the flow rate of the gas exceeds a limit or ceiling level, all or part of the gas from the wellhead stream automatically bypasses the catalytic oxidizing assembly 111 and is, e.g., released to the atmosphere in a raw, unprocessed state at pressure control valve 103. When the limit level of the flow rate is exceeded, the system opens the pressure safety relief valve 105, bypassing the catalytic oxidizing assembly 111 and releasing the raw gas to, e.g., the atmosphere. Once proper flow rates are re-achieved, either via the flow rate of the gas increasing to the self-sustaining level for the oxidation reaction or dropping below the limit level, then the heating element 116 can re-initiate in order to heat the catalyst pad 113 to the threshold temperature to restart the oxidation of the wellhead stream gas. In a second embodiment, the system does not include a bypass valve assembly and the raw, unprocessed gas is directed to the atmosphere through the catalyst pad 113 by inactivating the low temperature shut off valve 121, regardless of whether the flow rate of the gas falls below the self-sustaining level or exceeds the limit level.

In one embodiment of the system, the heating element 116 may be employed in the event that the flow rate of the surface casing vent flow falls below the threshold limit and the gas can continue to be processed utilizing the supplemental heat.

In an illustrative embodiment, the pressure control assembly 102 includes a pressure control valve 103 to set the desired pressure of the gas and a pressure regulating valve 104 to ensure steady pressure of the gas communicated to the catalytic oxidizing assembly 111, thereby maintaining a steady, continuous reaction at the catalytic oxidizing assembly 111. In one embodiment, the pressure control assembly 102 further includes one or more pressure safety relief valves 105 configured to automatically relieve buildups of gas pressure.

Under some conditions, the surface casing vent flow may include liquid, in addition to the natural gas. In an alternative embodiment, the system further includes a separator 101 operably connected to, i.e., in fluid communication with, the casing vent 203 of the wellhead 201. The separator 101 is disposed within the system such that it is operably connected to, i.e., in fluid communication with, the other components of the system. In this embodiment, the separator 101 precedes the pressure control assembly 102 and the catalytic oxidizing assembly 111. The separator 101 is configured to isolate the gas component from a liquid component of the surface casing vent flow. After being isolated by the separator 101, the gas component of the wellhead stream continues through to the pressure control assembly 102 to the catalytic oxidizing assembly 111 for processing. The liquid component of the wellhead stream is removed from the present system via an outlet 107, e.g., a drain valve. The separator 101 includes any type of gas-liquid separator known in the art, e.g., a gravity vapor-liquid separator. In one embodiment, the separator 101 is configured to operate up to 15 PSIG.

In one embodiment of the system, the catalytic oxidizing assembly 111 is mounted on a stand 119, which can be further attached to a stable structure on or in the ground by a bolt or another attaching device 120.

The wellhead emission control system can be utilized as an after-market modification to existing wellhead systems or integral to newly manufactured wellhead systems, i.e., as forming an improved wellhead system configured to control methane emissions.

Figure 2:
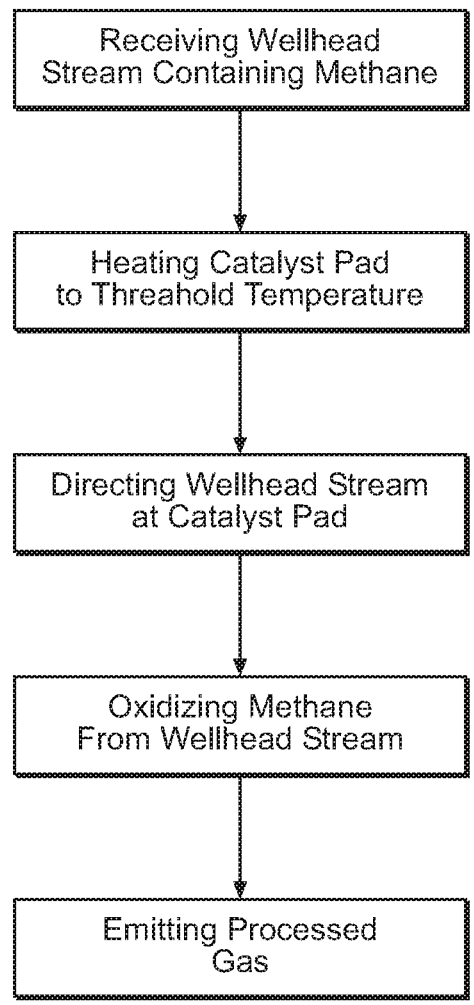
FIG. 2 shows a method of operation of a wellhead methane emission control system.

Referring now to FIG. 2, there is shown a method of operation of a wellhead methane emission control system. In sum, the present system operates by receiving the surface casing vent flow, i.e., wellhead stream, from the natural gas or oil well. The surface casing vent flow includes methane, in addition to other components. The system then heats the catalyst pad to the threshold temperature and directs the surface casing vent flow at the catalyst pad to initiate the oxidation reaction of the methane. The resulting processed gas containing carbon dioxide as a product of the oxidation reaction of the methane is then emitted from the catalytic oxidizing assembly.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A methane emission control system for a wellhead, comprising:
   a catalytic oxidizing assembly operably connectable to the wellhead and configured to receive a surface casing vent flow therefrom, the catalytic oxidizing assembly including a catalyst pad and a heating element;
   a pressure control valve configured to bypass the surface casing vent flow from the catalytic oxidizing assembly if a flow rate of the surface casing vent flow falls below a floor level, the floor level of the flow rate corresponding to a flow rate wherein exothermic oxidation of methane of the surface casing vent flow maintains a threshold temperature of the catalyst pads;
   the catalyst pad including a material configured to oxidize methane; and
   the heating element configured to heat the catalyst pad to the threshold temperature to initiate oxidation of methane of the surface casing vent flow.

2. A methane emission control system for a wellhead, comprising:
   a catalytic oxidizing assembly operably connectable to the wellhead and configured to receive a surface casing vent flow therefrom, the catalytic oxidizing assembly including a catalyst pad and a heating element;
   a pressure release valve configured to bypass the surface casing vent flow from the catalytic oxidizing assembly if a flow rate of the surface casing vent flow exceeds a ceiling level;
   the catalyst pad including a material configured to oxidize methane; and
   the heating element configured to heat the catalyst pad to a threshold temperature to initiate oxidation of methane of the surface casing vent flow.

3. A wellhead system for reducing methane emissions, comprising:
   a surface casing vent
   a catalytic oxidizing assembly operably connected to the surface casing vent and configured to receive a surface casing vent flow therefrom, the catalytic oxidizing assembly including a catalyst pad and a heating element;
   a pressure control valve configured to bypass the surface casing vent flow from the catalytic oxidizing assembly if a flow rate of the surface casing vent flow falls below a floor level, the floor level of the flow rate corresponding to a flow rate wherein exothermic oxidation of methane of the surface casing vent flow maintains a threshold temperature of the catalyst pad;
   the catalyst pad including a material configured to oxidize methane; and
   the heating element configured to heat the catalyst pad to the threshold temperature to initiate oxidation of methane of the surface casing vent flow.

4. A wellhead system for reducing methane emissions, comprising:
   a surface casing vent;
   a catalytic oxidizing assembly operably connected to the surface casing vent and configured to receive a surface casing vent flow therefrom, the catalytic oxidizing assembly including a catalyst pad and a heating element;
   a pressure release valve configured to bypass the surface casing vent flow from the catalytic oxidizing assembly if a flow rate of the surface casing vent flow exceeds a ceiling level;
   the catalyst pad including a material configured to oxidize methane; and
   the heating element configured to heat the catalyst pad to a threshold temperature to initiate oxidation of methane of the surface casing vent flow.

5. The methane emission control system of claim 1, further comprising a separator operably connectable to the wellhead in series with the catalytic oxidizing assembly, the separator configured to isolate a gas component from a liquid component of the surface casing vent flow.

6. The methane emission control system of claim 1, wherein the heating element is configured to heat the catalyst pad to at least 150° C.

7. The methane emission control system of claim 1, wherein the catalytic oxidizing assembly is connectable to a surface casing vent of the wellhead via piping.

8. The methane emission control system of claim 1, wherein the material of the catalyst pad is selected from a group consisting of platinum and palladium.

9. The methane emission control system of claim 1, wherein the catalytic oxidizing assembly is contained within a housing.

10. The methane emission control system of claim 9, wherein the housing is watertight.

11. The methane emission control system of claim 1, wherein the catalytic oxidizing assembly is supported aloft via a stand.

12. The methane emission control system of claim 2, further comprising a separator operably connectable to the wellhead in series with the catalytic oxidizing assembly, the separator configured to isolate a gas component from a liquid component of the surface casing vent flow.

13. The methane emission control system of claim 2, wherein the heating element is configured to heat the catalyst pad to at least 150° C.

14. The methane emission control system of claim 2, wherein the catalytic oxidizing assembly is connectable to a surface casing vent of the wellhead via piping.

15. The methane emission control system of claim 2, wherein the material of the catalyst pad is selected from a group consisting of platinum and palladium.

16. The methane emission control system of claim 2, wherein the catalytic oxidizing assembly is contained within a housing.

17. The methane emission control system of claim 16, wherein the housing is watertight.

18. The methane emission control system of claim 2, wherein the catalytic oxidizing assembly is supported aloft via a stand.

19. The wellhead system of claim 3, further comprising a separator operably connected to the wellhead in series with the catalytic oxidizing assembly, the separator configured to isolate a gas component from a liquid component of the surface casing vent flow.

20. The wellhead system of claim 3, wherein the heating element is configured to heat the catalyst pad to at least 150° C.

21. The wellhead system of claim 3, wherein the catalytic oxidizing assembly is connectable to the surface casing vent of the wellhead via piping.

22. The wellhead system of claim 3, wherein the material of the catalyst pad is selected from a group consisting of platinum and palladium.

23. The wellhead system of claim 3, wherein the catalytic oxidizing assembly is contained within a housing.

24. The wellhead system of claim 23, wherein the housing is watertight.

25. The wellhead system of claim 3, wherein the catalytic oxidizing assembly is supported aloft via a stand.

26. The wellhead system of claim 4, further comprising a separator operably connected to the wellhead in series with the catalytic oxidizing assembly, the separator configured to isolate a gas component from a liquid component of the surface casing vent flow.

27. The wellhead system of claim 4, wherein the heating element is configured to heat the catalyst pad to at least 150° C.

28. The wellhead system of claim 4, wherein the catalytic oxidizing assembly is connectable to the surface casing vent of the wellhead via piping.

29. The wellhead system of claim 4, wherein the material of the catalyst pad is selected from a group consisting of platinum and palladium.

30. The wellhead system of claim 4, wherein the catalytic oxidizing assembly is contained within a housing.

31. The wellhead system of claim 30, wherein the housing is watertight.

32. The wellhead system of claim 4, wherein the catalytic oxidizing assembly is supported aloft via a stand.

\* \* \* \* \*